Patented Jan. 27, 1942

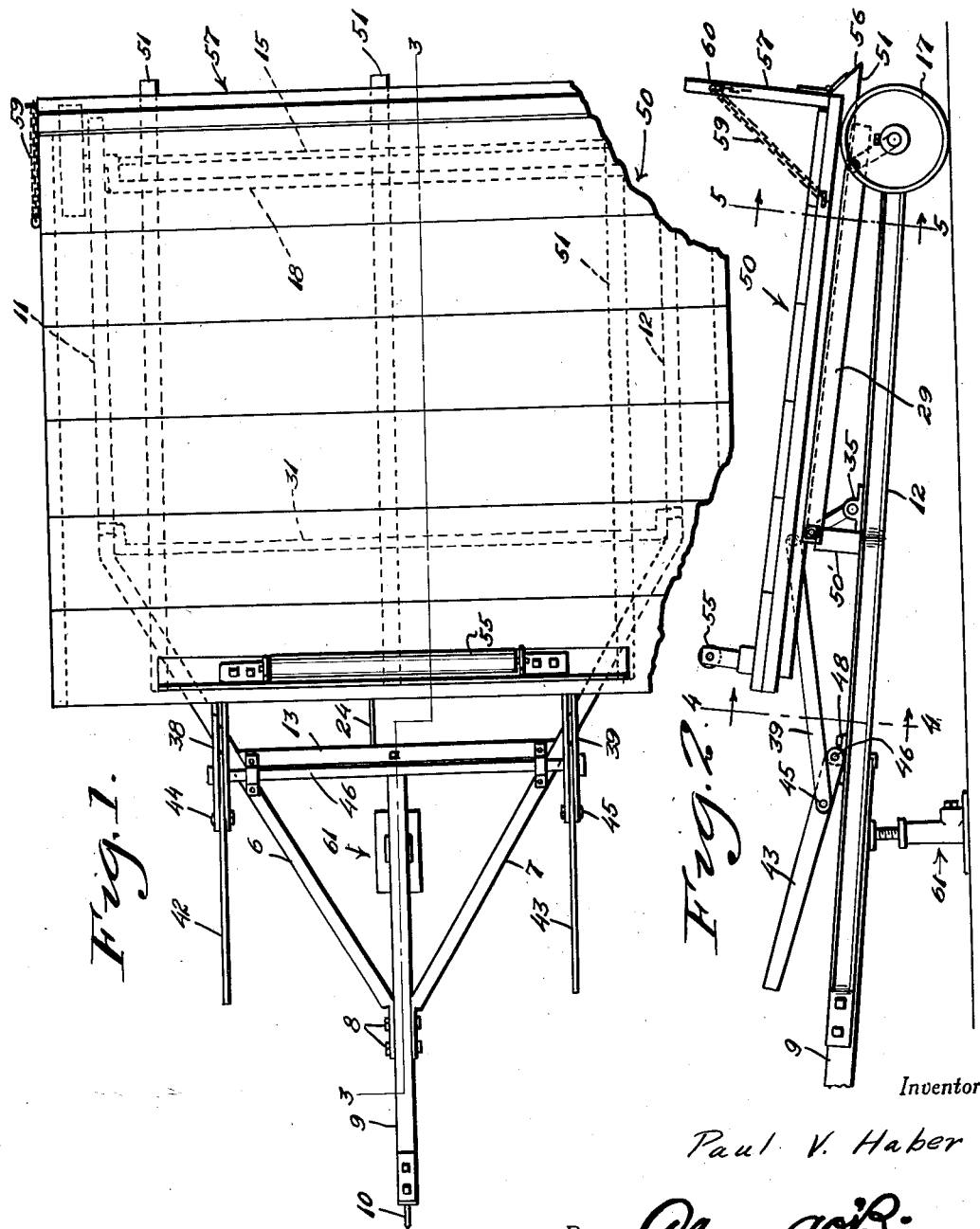

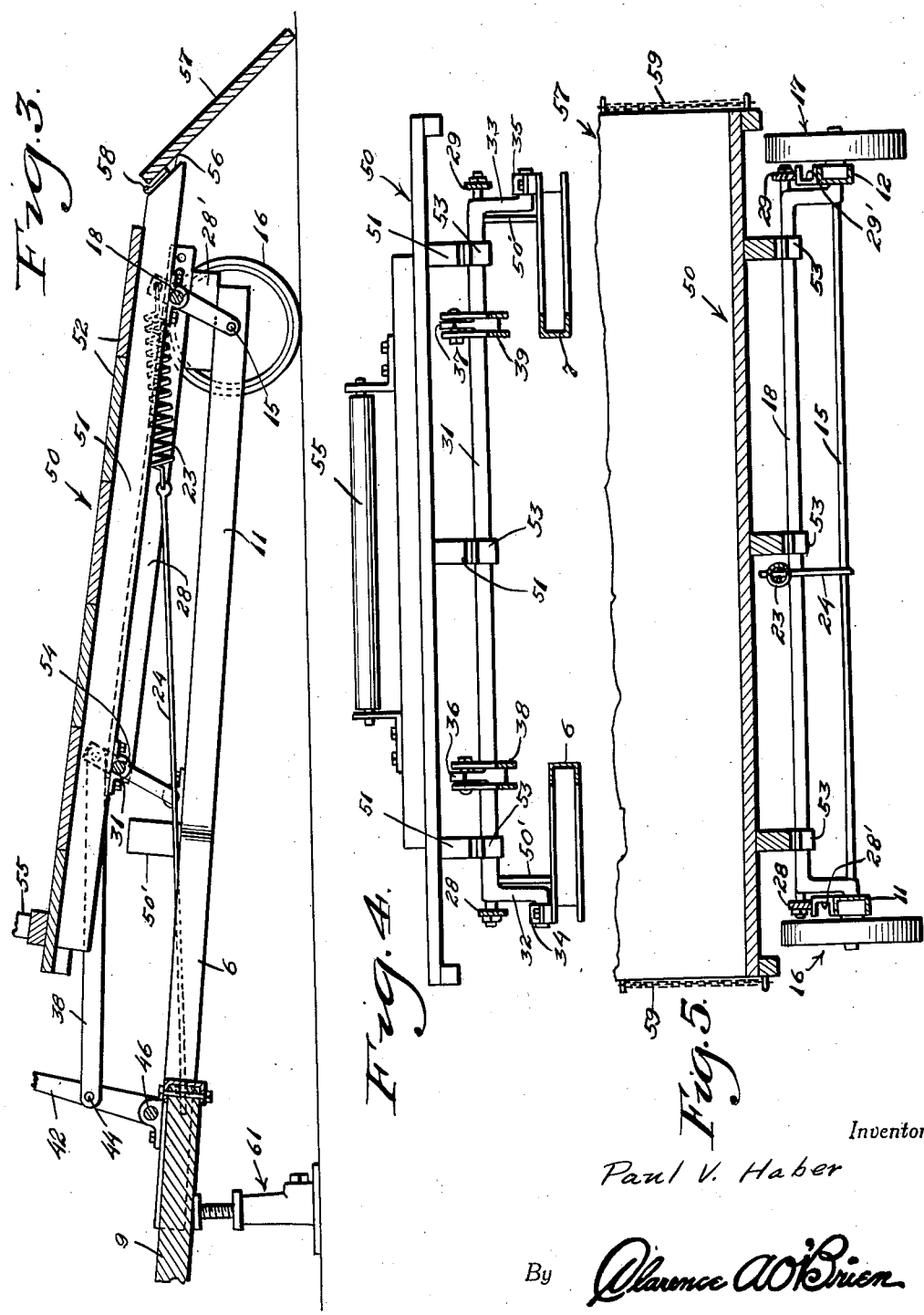

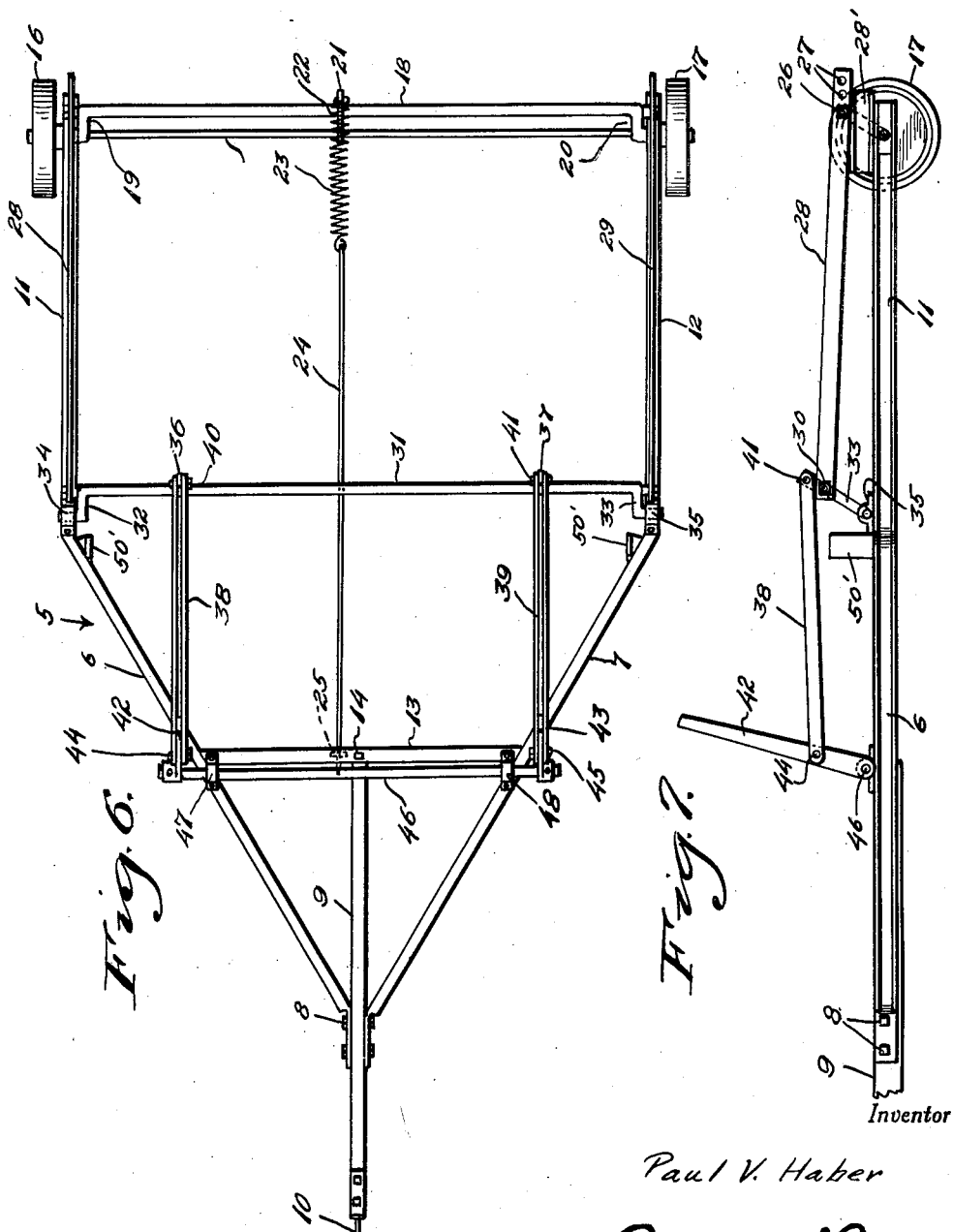

2,271,071

UNITED STATES PATENT OFFICE 2,271,071

CARRIER

Paul V. Haber, Rushville, Ill.

Application February 19, 1941, Serial No. 379,654

1 Claim. (Cl. 254—10)

My invention relates to improvements in carriers adapted to be drawn by another vehicle, and particularly to a carrier especially adapted for the loading and transporting of farm implements such as gang cultivators, and the like, and adapted to be operated and drawn by a farm tractor or the like, and the primary object of my invention is to provide a simple and efficient arrangement of this character which greatly facilitates the loading and transporting of farm implements and the like.

Other important objects and advantages of my invention will be apparent from a reading of the following description taken in connection with the appended drawings, wherein for purposes of illustration I have shown a preferred embodiment of my invention.

In the drawings:

Figure 1 is a top plan view of the embodiment partly broken away.

Figure 2 is a left hand side elevational view of the embodiment showing the same in load carrying position.

Figure 3 is a longitudinal vertical sectional view taken through Figure 1 along the line 3—3 and showing the embodiment in loading position.

Figure 4 is a transverse vertical sectional view taken through Figure 2 along the line 4—4 and looking toward the right in the direction of the arrows.

Figure 5 is a transverse vertical sectional view taken through Figure 2 along the line 5—5 and looking toward the right in the direction of the arrows.

Figure 6 is a top plan view of the frame of the embodiment with the platform removed.

Figure 7 is a left hand side elevational view of Figure 6.

Referring in detail to the drawings, the numeral 5 generally designates the frame which is composed of two forwardly converging bars 6 and 7, respectively, which are bolted or otherwise secured as indicated by the numeral 8 to the forward part of a longitudinally extending and centralized drawbar 9 which has a draft connection 10 on its forward end for connection with the draft vehicle such as a farm tractor or other traction vehicle. The rear ends of the converging bars 6 merge into parallel side bars 11 and 12, respectively, all of the bars mentioned being preferably of channel steel or other suitably rigid but light weight formation. A cross member 13 extends between and is secured to intermediate points of the converging bars 6 and 7 and the rear end of the drawbar 9 is secured to the center thereof as indicated by the numeral 14.

The rear ends of the parallel side bars 11 and 12 are spaced and connected by axle structure including an axle 15 traversing the bars 11 and 12 and having ground engaging wheels 16 and 17 on the outer ends thereof at the outer sides of the bars 11 and 12. A forwardly and rearwardly swingable horizontal rod 18 has depending arms 19, 20, respectively, which are pivoted at their lower ends on the axle 15 immediately adjacent the side bars 11 and 12, and the rod 18 has intermediate its ends a vertical arm 21 having a spring anchor 22 projecting forwardly therefrom and connected with a contractile helical spring 23 which has its forward end connected to a rod 24 which has its forward end anchored as indicated by the numeral 25 at the underside of the cross member 13. The opposite ends of the rod 18 have axially projecting pintles 26 arranged for selective engagement through holes 27 longitudinally spaced in the rear end portion of connecting rods 28 and 29, respectively, which are positioned above the side bars 11 and 12 in vertical and longitudinal alignment therewith. The front ends of the connecting rods are connected as indicated by the numeral 30 to axially projecting pintles on the opposite ends of a forwardly and rearwardly swingable rod 31 which has depending end portions 32 and 33, respectively, which have laterally projecting pintles journaled in brackets 34 and 35, respectively, which are suitably secured to the upper side of the forward end portion of the side bars 11 and 12. A pair of upwardly projecting arms 36 and 37 project from the rod 31 at equally spaced points from the side bars 11 and 12 and to the upper or free ends of these arms are pivotally connected the rear ends of dual connecting rods 38 and 39, respectively, the component elements of which are engaged with opposite sides of the arms 36 and 37 on the same pivots 40 and 41, respectively. The forward ends of the connecting rods 38 and 39 are pivoted to opposite sides of intermediate portions of forwardly and rearwardly swingable levers 42 and 43, respectively, the pivotal points being indicated by the numerals 44 and 45, respectively.

The levers 42 and 43 have their lower ends mounted on a rotatable shaft 46 which is mounted in bearings 47 and 48 which are secured to the tops of the converging bars 6 and 7 and the top of the cross member 13 of the frame structure.

In view of the arrangement described it will be obvious that either one of the levers 42 or 43 can be operated by swinging the same forwardly and rearwardly so as to correspondingly move the rods 18 and 31. In the event that the levers are swung forwardly the movement of the rods 31 and 18 forwardly will relax the contractile spring 23, while rearward swinging of the levers 42 and 43 or either of them by manual application thereto will produce corresponding rearward swinging of the rods 31 and 18, resulting in stretching of the spring 23.

Supportably mounted on the rods 31 and 18 is the platform which is generally designated 50 which consists of a suitable number of longitudinally arranged bolsters 51 on which boards 52 are laid and secured crosswise and to extend beyond the sides of the ground engaging wheels 16 and 17, the rear parts of the bolsters having suitable bearings 53 on the bottom thereof rotatably receiving the rod 18 as shown in Figure 5 whereby the rear platform is supportably and securably mounted on the rod 18 with the forward part of the platform similarly mounted by means of bearings 54 on the rod 31, whereby the platform 50 is forwardly and rearwardly movable in accordance with the operation of one or both of the levers 42 and 43. On the forward part of the platform is mounted a transverse elevated roller 55 over which a cable or chain is trained from the tractor vehicle (not shown) for drawing the gang cultivator or the like (not shown) up onto the platform 50.

The rear ends of the bolsters 51 project as shown in Figure 3 beyond the platform 50 and have their rear end terminals downwardly beveled as indicated by the numeral 56, with a tail gate 57 hinged as indicated by the numeral 58 to the said terminals so that the tail gate can occupy a declining position such as illustrated in Figure 3 and form a ramp up along which the gang cultivator or the like is adapted to be drawn to deposit it upon the platform, with the tractor vehicle acting as a winch operating on the cable lying on the roller 55 to draw the gang cultivator or the like up the ramp 57 and onto the platform.

The hinge connection 58 is such that the forward swing of the tail gate 57 is stopped in an upright or right angular position as shown in Figure 2, wherein chains 59 secured to the opposite sides of the platform are engageable with elements 60 on the upper part of the ends of the tail gate to hold the same in place to retain the gang cultivator or the like in place on the platform 50.

The loading of the trailer starts with the parts of the invention in the positions illustrated in Figure 3, with a suitable jack 61 engaged with the bottom of the drawbar 9 to support the frame 5 at a slight upward inclination toward the front. As the cable is operated to bring the load in position on the platform 50 and as the tail gate 57 is brought up in the position shown in Figure 2, the levers 42 and 43 are swung forwardly so as to turn the rods 31 and 18 in a forward direction and carry the platform 50 forwardly so as to redistribute the center of gravity of the platform and of the load in front of rather than to the rear of the axle 15 on which the ground engaging wheels are mounted. The spring 23 tends to maintain this over center position of the platform so that this tendency together with the positions of the parts involved, enables the trailer to safely and efficiently carry the load after the jack 61 has been removed and the draft connection 10 has been made fast to the tractor vehicle and the tractor vehicle is moved forwardly to deliver the load at a point remote from the loading place.

To deposit the load again on the ground, the tail gate 57 is let down by undoing the chains 59 and swinging the gate rearwardly and downwardly. This action is followed by rearward swinging of one or both of the levers 42 and 43, so that the load moves rearwardly with the platform 50 in an upward, rearward, and then downward movement, so that the rearward movement of the load relative to the platform 50 is facilitated and the trailer may be drawn forward by means of the tractor so as to take advantage of the incline of the platform 50 then existing to deposit the load on the ground.

Although I have shown and described herein a preferred embodiment of my invention, it is to be definitely understood that I do not wish to limit the application of the invention thereto except as may be required by the scope of the subjoined claim.

Having described the invention, what is claimed as new is:

A carrier of the type described comprising a frame including a pair of longitudinal frame members having their rear ends disposed in parallel relation and converging toward their front ends from a point intermediate the front and rear ends of the frame, a transverse frame member intermediate the front and rear portions of the converging ends of the frame members, a drawbar connected at an intermediate point to the front converging ends of the frame members and said drawbar also connected at its rear end to said transverse frame member, a forward crank and a rearward crank rotatably mounted transversely on the parallel rear end of the frame, said cranks being arranged with their throws in vertical position, a platform secured to said throws for movement therewith, links connecting the cranks, a transverse shaft mounted on the frame adjacent its front end, levers secured to said shaft, links connecting the levers to the front crank for actuation thereof and spring means urging the cranks toward a forward position.

PAUL V. HABER.